March 17, 1964 B. P. SCHABERG 3,125,116
APPARATUS FOR LAUNCHING AND EXTRACTING SPHEROIDS IN PIPELINES
Filed Aug. 8, 1960 4 Sheets-Sheet 1

INVENTOR
Burt P. Schaberg

BY *Strauch, Nolan + Neale*
ATTORNEYS

INVENTOR
Burt P. Schaberg

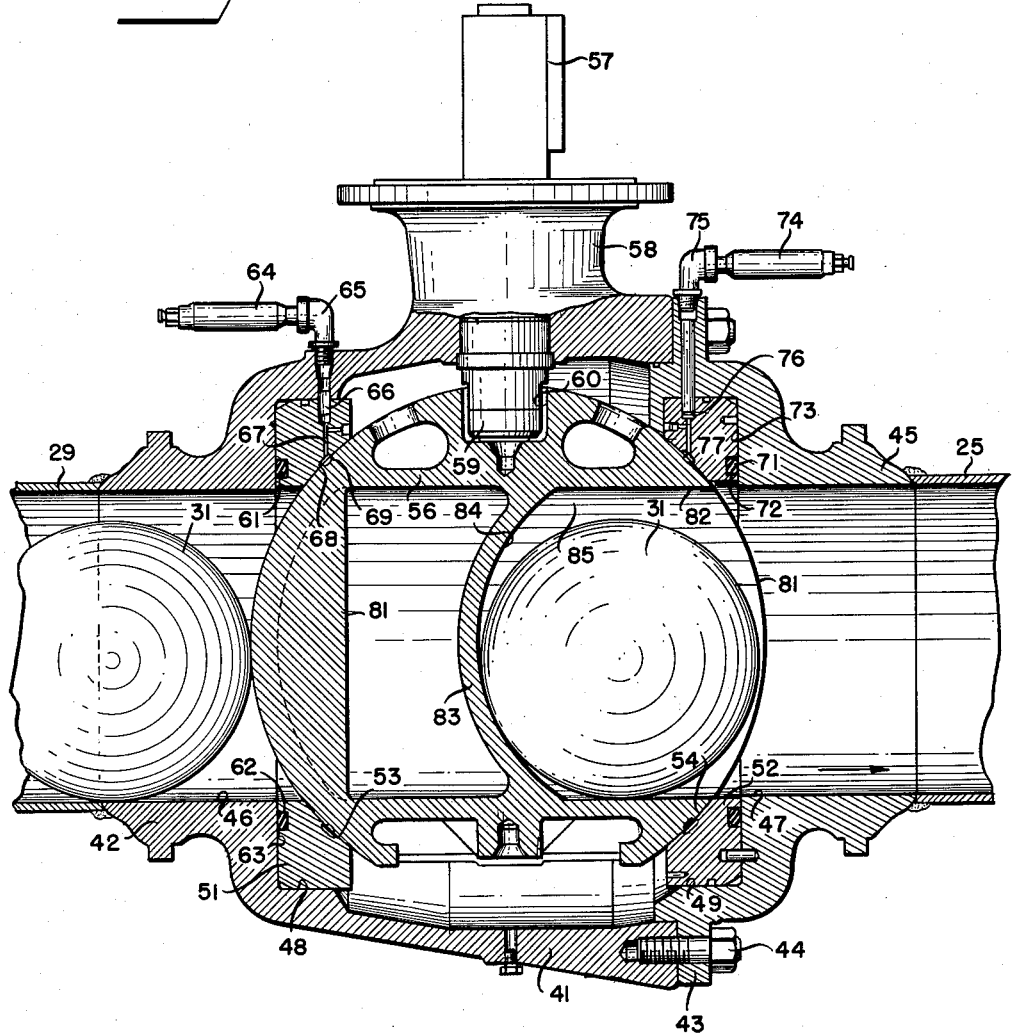

March 17, 1964 B. P. SCHABERG 3,125,116
APPARATUS FOR LAUNCHING AND EXTRACTING SPHEROIDS IN PIPELINES
Filed Aug. 8, 1960 4 Sheets-Sheet 4
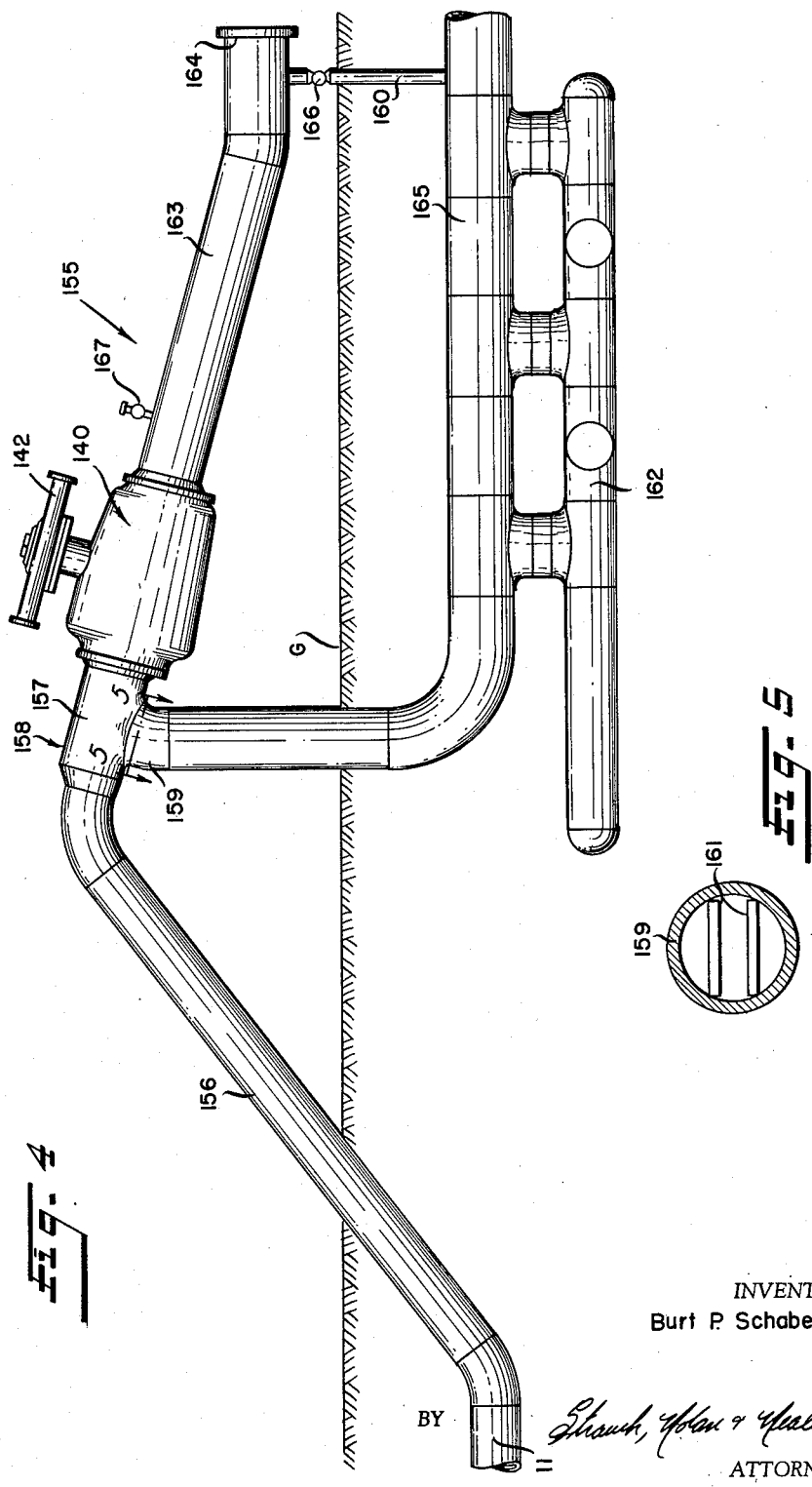
INVENTOR
Burt P. Schaberg
BY
ATTORNEYS United States Patent Office 3,125,116
Patented Mar. 17, 1964

3,125,116
APPARATUS FOR LAUNCHING AND EXTRACT-
ING SPHEROIDS IN PIPELINES
Burt P. Schaberg, Colorado Springs, Colo., assignor to
Rockwell Manufacturing Company, Pittsburgh, Pa., a
corporation of Pennsylvania
Filed Aug. 8, 1960, Ser. No. 48,265
3 Claims. (Cl. 137—268)

This invention relates to the launching and handling of spheroids in pipelines and is particularly concerned with apparatus for the purpose.

The use of elastomer spheroids introduced at properly spaced intervals into fluid pipelines has been suggested for a number of purposes including the removal of deposits from the interior of the line, reducing longitudinal diffusion of interfacial mixtures in transit and the recovery of distillate or condensate in gas transmission lines. The present invention is described in detail in connection with the launching of spheroids into the pipeline primarily for condensate removal, but it will be appreciated that the invention is not limited to such but is useful in launching spheroids into transmission lines for any purpose.

Systems and apparatus for launching spheroids into transmission lines have previously been proposed. One example of such a prior system and apparatus is described in an article entitled "The Pipeline Spheroid—An Effective Technique for Fluid Separation," published in the June 1959 issue of "Pipeline News." The present invention is an improvement to the system and apparatus described therein in that it represents a simplified and effective means to select the spheroids singly from the reservoir and launch them into the main transmission line.

The spheroids which the invention contemplates introducing into the pipeline are inflatable spherical synthetic rubber or other elastomer balls which preferably contain a fluid such as water under pressure and are usually inflated to a diameter that is approximately equal to or slightly less than the internal pipe diameter to be traversed when the purpose to be accomplished is merely condensate removal. When, however, it is desired to remove foreign deposits from the interior of the line, or the purpose is to effect interfacial separation of a number of different fluid products to be sent through the line at the same time, the spheroids are customarily inflated to a size slightly larger than the inside diameter of the line. For example, in the case of condensate removal in a thirty-inch external diameter pipeline with an internal diameter of twenty-nine and three-eighth inches, the spheroid would be inflated to about one-eighth inch smaller in diameter than the pipe internal diameter or, in other words, to twenty-nine and one-quarter inches, and it retains its spherical shape as it is displaced along the pipe under gas line pressure.

These elastomer spheroids are forced through the line by the pressure of the fluid admitted behind them and scrape or wipe the inner surface of the pipe pushing before them condensate and other solids in the line. In the case of product separation, it is customary to insert one or more spheroids at predetermined intervals between two different products to minimize undesirable mixing of the two products. It will be understood that applicant does not claim to be the inventor of such spheroids, or the originator of their use in pipelines, but the invention does contemplate novel apparatus for launching such spheroids into the pipeline and for extracting them and recovering them.

The term "spheroid" includes not only truly spherical shapes but also such forms as oblate and the like which these members may assume for pipeline transmission.

It is therefore a major object of this invention to provide a novel apparatus and method for launching spheroids into a pipeline.

It is a further object of the invention to provide a novel spheroid launching apparatus that does not interfere with normal transmission of fluid through the pipeline.

Another object of the invention is to provide a novel spheroid launching apparatus wherein spheroids are extracted one by one from a supply chamber and introduced into the pipeline without escape of fluid under pressure from the line.

It is a further object of the invention to provide a spheroid launching apparatus wherein a novel transfer member moves between one position where it extracts a spheroid from a supply chamber and another position to deliver the spheroid into a branch pipe leading to the pipeline without loss of fluid from the pipeline.

It is a further object of the invention to provide a novel spheroid launching apparatus that comprises a chamber for containing a succession of spheroids, a valve-like transfer member at an open end of the chamber, and a delivery conduit at the other side of said member adapted to be connected into the pipeline.

A further object of the invention is to provide in a spheroid launching apparatus a novel rotatable spheroid transfer and pressure seal device that is pocketed to receive a spheroid and is rotatable, as through about 180°, to deliver that spheroid to a fluid-filled pipeline.

Further objects of the invention will become apparent from the following description and claims in conjunction with the annexed drawings in which:

FIGURE 3 is an enlarged section like FIGURE 2 but showing the parts in spheroid launching position;

FIGURE 4 is an enlarged view showing a spheroid and condensate removal section of a pipeline and particularly showing a spheroid extractor; and FIGURE 5 is a section on line 5—5 of FIGURE 4 showing a grating to prevent spheroids from continuing in the gas line.

Figure 1:
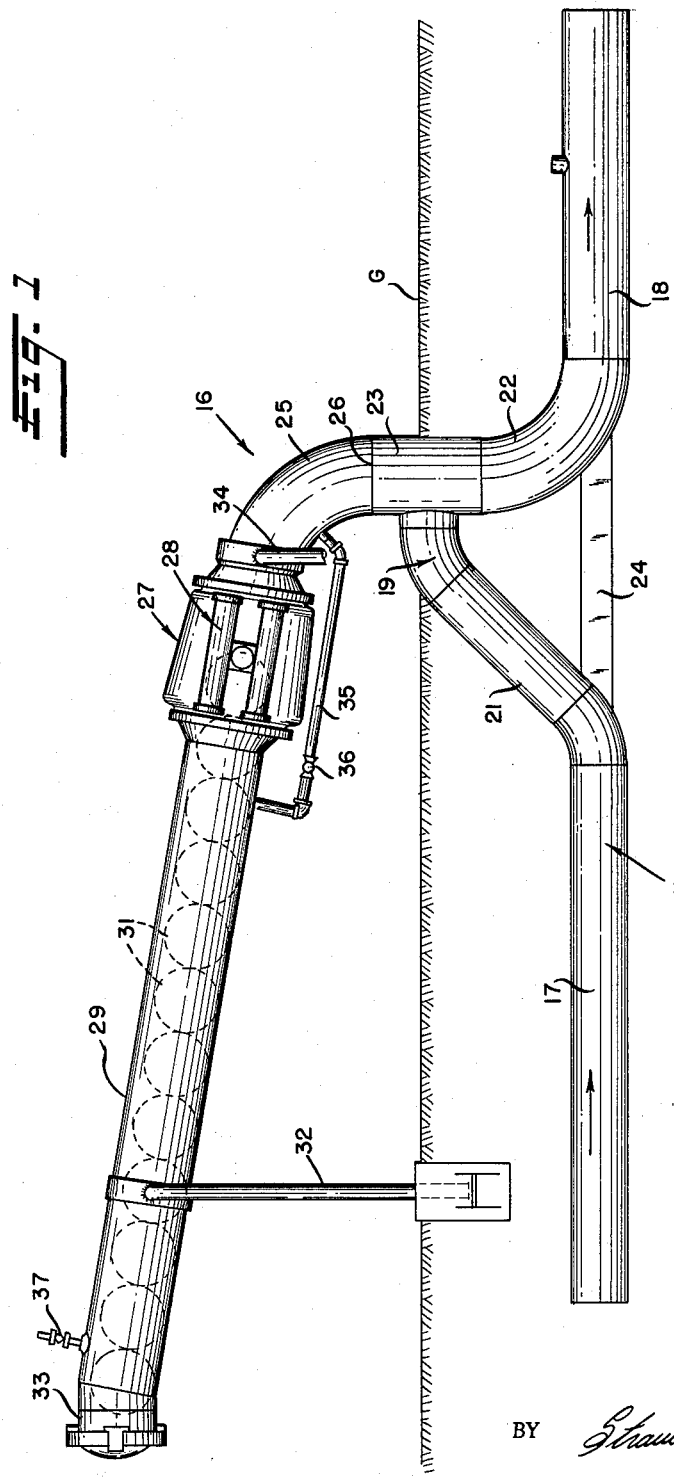
FIGURE 1 is a side elevation showing a spheroid launching assembly of the invention as it is associated with a pipeline.

FIGURE 1 show a pig launching assembly 16 coupled into the pipe line and it will be noted that there is no interference with normal flow of gas through main line 11. Gas under pressure flows to the right in line 11 in FIGURE 1 from an upstream section 17 to an aligned downstream section 18 which may be of larger diameter. Between sections 17 and 18 is an inverted Y-section 19 having inclined arms 21 and 22 connected into a T-section 23, all of which may be disposed below the ground level G as shown. A rigid brace 24 connects arms 21 and 22.

A launching conduit section 25 is attached at 26 to the T-section 23 in alignment with downstream pipeline section arm 22, so that conduit 25, the bridge of T-section 23 and arm 22 form essentially a continuous open conduit connecting with downstream section 18 and leading smoothly into it.

Conduit 25 and bridge 23 are of the same diameter and arm 22 is a reducing elbow that merges from the larger diameter of conduit 25 to the smaller diameter of main pipe section 18. For example, if pipe section 17 is sixteen inches in diameter and pipe section 18 is eighteen inches in diameter, conduit 25 and bridge 23 may be twenty inches in diameter and elbow 22 will merge from twenty inches in diameter at its upper end to eighteen.

In addition to conduit 25, each launching assembly comprises a valve-like spheroid selecting and launching device indicated at 27 and having an operator 28, and a supply chamber 29 in the form of an elongated upwardly inclined pipe preferably of the same diameter as conduit 25 containing a plurality of spheroids 31 arranged to roll or slide by gravity toward device 27. The spheroids 31, as will appear, are smaller in diameter than chamber 29 and conduit 25 for free movement, and are preferably about the diameter of line section 18 for a reason to appear.

A suitable rigid support 32 locates chamber 29 at the correct level and inclination, and a removable gas tight cover 33 is provided at the upper end of chamber 29 where the supply of spheroids is introduced. A further rigid support 34 is attached to the launching assembly near the lower end of device 27.

A pressure by-pass conduit 35 connects the interior of conduit 25, which is at main pipeline pressure, with the interior of chamber 29 and a manually operated valve 36 is provided in conduit 35. The purpose of conduit 35 is to equalize the internal pressures in chamber 29 and launching conduit 25, thereby facilitating ease of operation of launching device 27 during the launching operation. A manual pressure release valve 37 is provided for chamber 29, to re-establish atmospheric pressure in chamber 29 when it is to be loaded with spheroids. Thus with valve 37 closed, cap 33 in place and valve 36 open, the entire launching assembly will be internally pressurized to correspond to the main pipeline pressure. In practice, before valve 37 is opened, valve 36 is closed, and then cover 33 may be safely removed.

Figure 2:
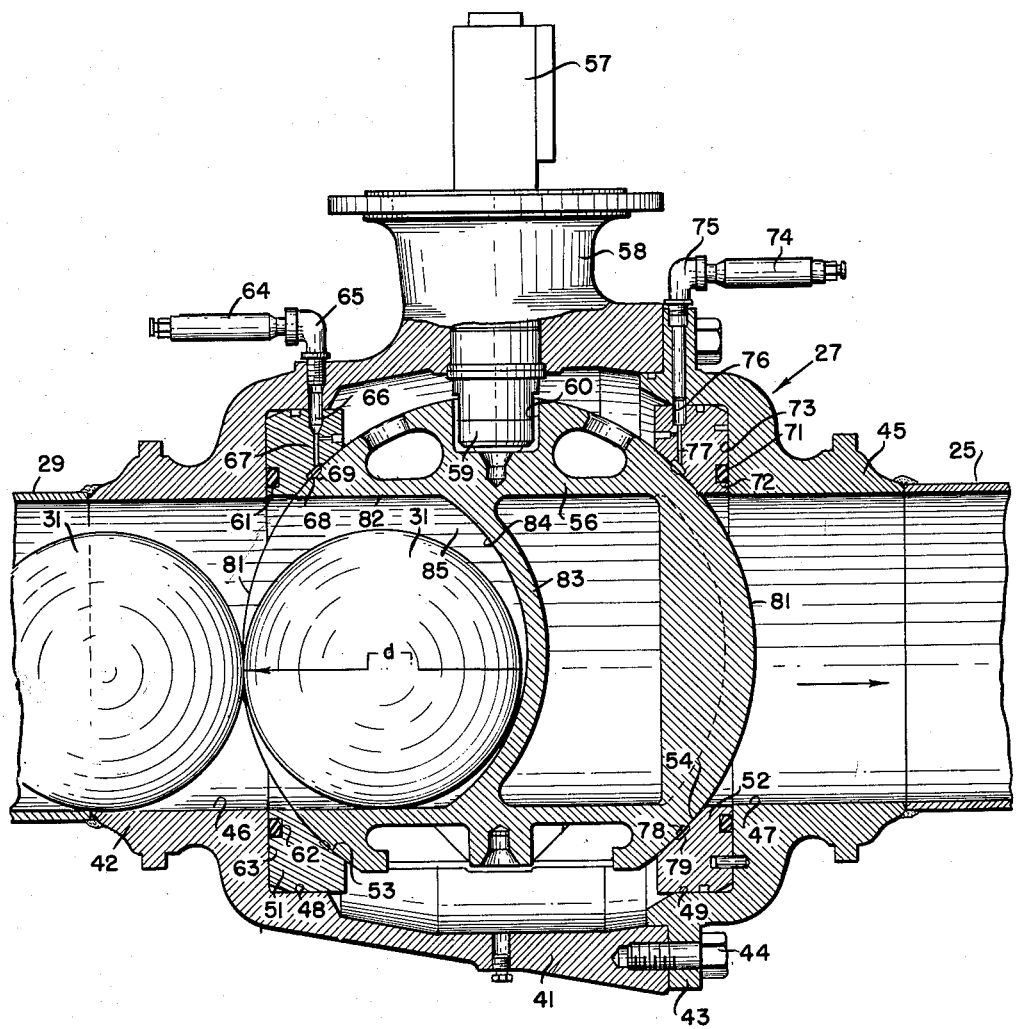
FIGURE 2 is an enlarged view mainly in section showing the launching device of the invention, with the parts positioned ready to send a spheroid into the pipeline.

Referring now to FIGURES 2 and 3 which illustrate the launching device 27 in particular detail, a body casing 41 is formed at one end with a hollow pipe attachment boss 42 and its other end is closed by cover 43 removably secured thereto as by bolts 44. A hollow cover boss 45 is similar to and axially aligned with body boss 42, and bosses 42 and 45 are provided respectively with coaxial cylindrical passages 46 and 47 of substantially the same size as chamber 29 and conduit 25.

Internally, the casing is formed with cylindrical bores at 48 and 49 surrounding the inner ends of passages 46 and 47, and rigid annular seat rings 51 and 52 are slidably mounted for axial displacement in bores 48 and 49. Seat rings 51 and 52 are formed with substantially identical annular spherical ball seating surfaces 53 and 54.

A ball-like spheroid transfer member 56 is externally formed with spherical surface portions seated on and having the same center of curvature as ring surfaces 53, 54. A stem 57 extends rotatably through upper body boss 58 and has its lower end detachably but non-rotatably connected with member 56, as by a tang 59 and recess 60, so that rotation of stem 57 about its axis correspondingly turns member 56 about the same axis.

The rear face of seat ring 51 is annularly grooved at 61 to receive a resilient O-ring 62 of rubber or the like that is compressed axially between ring 51 and the radial body face 63. Spherical seat ring surface 53 and the adjacent spherical surface of member 56, which have a common center in the assembly, are formed with a lubricant distribution system whereby plastic lubricant from a reservoir 64 is introduced under pressure through a fitting 65 through a flexible tube 66 and ring passage 67 to shallow grooves 68 and 69, formed respectively in surface 53 and in the spherical surface of the ball member 56.

Similarly, a resilient O-ring 71 is mounted in seating groove 72 so as to be axially compressed between seat ring 52 and radial body face 73, and a reservoir 74 supplies plastic lubricant under pressure through a fitting 75, flexible tube 76 and seat ring passage 77 to a shallow groove system at 78, 79 in the engaging spherical surfaces of member 56 and seat ring 52.

In the assembly, the O-rings 62 and 71 perform the dual function of providing a seal between rings 51 and 52 and the abutting surfaces 63 and 73 in the casing 41 and cover 43, and as springs to axially bias the seat rings 51 and 52 into spherical surface engagement with the ball-like member 56. The seat rings 51 and 52 and the associated lubricant system are essentially the same as the seat ring and lubricant passage and groove arrangements disclosed in United States Letters Patent to Scherer No. 2,788,015, issued April 9, 1957. The lubricant grooves are effective in either of the 180° limit positions of member 56 shown in FIGURES 3 and 4 to provide continuous grooving around both of the spherical seating surfaces whereby a uniform film thickness seal of plastic lubricant may be provided at surfaces 53 and 54.

When lubricant pressure is increased by manipulation of either reservoir at 64 or 74, the associated seat ring and ball surfaces are jacked apart under hydraulic pressure against the force of the biasing O-ring. In practice, this sealing arrangement prevents outward escape of line fluid pressure, as when chamber 29 is being supplied with spheroids.

The ball-like member 56 has essentially the same tang and slot connection to the stem 57 as the ball and valve stem in said Scherer patent, which enables the member 56 to displace slightly axially of passages 46, 47 without binding the stem, and rotation of member 56 is effected on an axis normal to the axis of passages 46, 47 and substantially containing the center of surfaces 53 and 54.

The member 56, however, is not a ported ball as in said Scherer patent, but is of special structure for the transfer of one spheroid 31 at a time from chamber 29 to conduit 25. As shown, a blind bore 82 is provided in member 56. The numeral 81 indicates a spherically curved zone portion of the member 56 which extends around the member 56 between the seat rings and is interrupted only by the open mouth of bore 82. This surface at 81 is preferably a continuation of the spherical seating surfaces of member 56. Bore 82 is cylindrical and of the same diameter as passages 46, 47 and the openings through the seat rings, the bottom of bore 82 being an internal wall 83 having a concave surface 84 that is preferably spherical and about the same curvature as surface of member 56. The walls 83 and defining zone 81 may be cast integral with the rest of the member 56 by means of methods well known in the art such as, for example, by the use of cantilever cores. However, if desired, the member 56 can be first produced with bore 82 extending completely through it, as shown in said Scherer Patent 2,788,015, and the walls 81 and 83 may be separate members which may be mechanically secured in place as desired. In either case, a ball receiving pocket 85 is formed in which the depth $d$ of the pocket 85 is substantially equal to the diameter of a spheroid 31. Thus, outer surface of spheroid 31, when received in pocket 85 (FIGURE 2), is substantially tangent at its left side to the outer surface of zone 81 of the member 56.

FIGURE 2 shows the device as it is normally disposed preparatory to actuation for launching a spheroid. The several spheroids in chamber 29 tend to move down under the influence of gravity toward the transfer member 27, the leading spheroid being disposed in pocket 85. Since the spheroid diameter equals the pocket depth the next spheroid, as shown in FIGURE 2, lies in contact with spheroid 31 in pocket 85 essentially at a point which is tangent to the outer surface of the ball member 56.

In operation, member 56 is rotated through 180° from the FIGURE 2 position to that of FIGURE 3 by means of operator 28. It will be seen that as member 56 rotates about the axis of stem 57, the spheroid in pocket 85 will be transferred to the other side of launching device 27 where pocket 85 is now open to conduit 25 and the spheroid free to move down thereinto. The next spheroid is blocked from movement out of chamber 29 by reason of sliding engagement with the surface 81 of member 56, and because of the relative size of the diameter of the spheroid 31 and the depth of pocket 85, cutting or pinching of the next spheroid by the edge of bore 82 as it slides past the next ball is minimized or eliminated.

After the spheroid 31 has left pocket 85 in FIGURE 3 and moved into conduit 25, the operator 28 is reversed to return transfer member 180° to FIGURE 2 position where pocket 85 now receives the next spheroid.

At the end of or at a suitable station along the pipeline 11, an assembly is provided for recovering the spheroids, and also in the case of a gas line where the spheroids have been collecting distillate before them for recovering the distillate. Such a station is shown at 155 in FIGURE 4.

Referring to FIGURE 4, the line 11 rises above ground in an inclined section 156 to enter the bridge 157 of a T-coupling 158. At the junction of bridge 157 and leg 159 is a grating comprised of bars 161, as shown in FIGURE 5. The spheroids, of which there may now be a number in a row in line 11, pass freely through bridge 157 which is of enlarged diameter, over the grating and the first spheroid enters an assembly 140 which may take the form in which bore 82 (FIGURE 2) extends completely through the transfer member 56 in the manner shown in the aforementioned Scherer Patent 2,788,015, the bore being of sufficient diameter to accommodate any size of sphere likely to be encountered. In such a case, the spherical member is normally in closed position when fluid is being transported through the line and is open when it is desired to recover spheroids, the spheroids merely passing through the bore and into barrel 163. The assembly 140 is then operated to rotate the member 56 to its closed position, valve 166 is closed and the valve 167 is opened to vent pressure from barrel 163. The cover 164 may then be removed to recover the spheroids.

The distillate displaced ahead of the spheroids in pipe 11 discharges down through grating 161 and into the open leg 159 of the T-coupling, the spheroids being prevented from dropping through by grating 161. The distillate enters the manifold 162 where it is collected and eventually withdrawn.

Alternatively, the recovery assembly may be of the same form as launching device 27 illustrated in FIGURES 2 and 3 to extract each spheroid individually from the line without loss of pressure. In such a case, the receiver assembly would be located with a sufficient length of conduit between it and bridge 157 to accommodate all the spheroids previously launched into the line and permit the free passage of line fluid through bridge 157, leg 159 and conduit 165 while the spheroids are being extracted from the line one by one.

A conduit 160 may be provided to serve the dual purpose of supporting barrel 164 and to balance the pressure across the recovery device 140 through valve 166. A pressure blow down valve for barrel 163 is provided at 167.

In operation, successive spheroids or "pigs," as they are known in the field, are launched into the line wherever the pipe diameter changes. The smaller spheroids are driven ahead of the larger which does the work of wiping the interior of the pipe.

The spheroids may be launched at each station automatically by suitable triggering means in the line operatively connected to the operator, or manually.

The launching system is in condition for operation when the launcher 27 is in the position shown in FIGURE 2. To load the barrel 29 with a supply of spheroids, the valve 36 (FIGURE 1) is closed and valve 37 is opened to relieve the pressure within the barrel. During the loading operation the line pressure in conduit 25 is sealed from barrel 29 by the seal engagement between the member 56 and seat rings 51 and 52. Thus the transfer member 56 performs the dual function of acting as a valve and as a spheroid transfer member. The cover 33 may now be removed, the spheroids inserted, and cover 33 again secured in place. The valve 37 is then closed and valve 36 is opened. The launcher 27 is now ready for the pig transfer operation.

It will be appreciated that while at 27, there is disclosed a preferable form of launching device which involves invention and is essentially a rotatable spherical plug, the broader aspects of the invention may take other mechanical forms for the purpose without departing from the spirit thereof, as will be evident from the claims.

The scope of the applicant's invention is defined by the appended claims rather than by the foregoing description, it being understood that the embodiments disclosed herein are to be considered illustrative and not restrictive and all changes which come within the meaning and range of equivalency of the claims are therefore intended to be embraced therein.

What is claimed and desired to be secured by United States Letters Patent is:

1. In a spheroid launching assembly comprising an inclined tube forming a gravity feed supply chamber for a plurality of spheroids in a row, the improvement characterized by a movable transfer member at the lower end of said chamber, a spheroid conveying passage at the other side of said transfer member, means providing an open pocket in said transfer member adapted to wholly receive one spheroid at a time, a spheroid in said pocket of such a diameter that when wholly received within said pocket with the pocket aligned with said chamber the next spheroid in the chamber row may contact the spheroid in the pocket under influence of gravity but remains outside the pocket, means for moving said transfer member to align the pocket with said passage for delivery thereto of the pocketed spheroid, and means on said transfer member effective during said movement of the transfer member for preventing displacement of the said next spheroid toward the transfer member.

2. In a spheroid handling assembly, means defining a hollow body having internal spherically curved seats surrounding opposed inlet and outlet passages for said body, a plug in said body mounted for rotation about an axis perpendicular to said passages and having spherical surfaces in engagement with said seats so that said plug is essentially wholly supported by said seats in said body, means providing at one side of said plug a spheroid receiving closed bottom pocket having a dimension in the direction of said axis slightly greater than a spheroid diameter and a depth of essentially the same diameter as a spheroid to be handled, means providing a spherically curved external surface on said plug adapted to block one or the other of said passages as said plug is rotated between positions to dispose the pocket in spheroid exchange alignment with the opposed passage, said pocket having an open mouth bounded by said spherical surface on the plug, a spheroid in said pocket, said spheroid being of such diameter than when wholly received in said pocket its outer periphery is substantially tangent to a spherical envelope containing said spherical surface on said plug, and means for gravity feeding a row of said spheroids toward said pocket, the lowermost of said spheroids in said row being contacted by the spheroid in said pocket and said plug surface during rotation of said plug between said positions.

3. In a pig launching assembly comprising an inclined tube forming a gravity feed supply chamber for a plurality of separate pigs in a row, the improvement characterized by a movable transfer member at the lower end of said chamber, a pig conveying passage at the other side of said transfer member, means providing an open pocket in said transfer member adapted to wholly receive only one pig at a time, a pig in said pocket, said pig having such dimension in the direction of its movement into said pocket that when wholly received within said pocket with the pocket aligned with said chamber the next pig in the chamber row may contact the pig in the pocket under influence of gravity but remains outside the pocket, means for moving the transfer member to align the pocket with said passage for delivery thereto of the pocketed pig, and means on said transfer member effective during said movement of said transfer member for preventing displacement of the said next pig toward the transfer member.

References Cited in the file of this patent

UNITED STATES PATENTS

| | | |
|---|---|---|
| 2,151,993 | Sears | Mar. 28, 1937 |
| 2,755,742 | Vincent | July 24, 1956 |
| 2,786,219 | Meyer | Mar. 26, 1957 |
| 2,953,157 | Osborne | Sept. 20, 1960 |